United States Patent [19]

Kempf et al.

[11] 4,320,452
[45] Mar. 16, 1982

[54] DIGITAL BUS AND CONTROL CIRCUITRY FOR DATA ROUTING AND TRANSMISSION

[75] Inventors: Mark F. Kempf, Glen Ellyn; D'Arcy C. Randall, Winfield; Timothy R. Walworth, Naperville, all of Ill.

[73] Assignee: Standard Oil Company (Indiana), Chicago, Ill.

[21] Appl. No.: 920,409

[22] Filed: Jun. 29, 1978

[51] Int. Cl.³ .............................................. G06F 15/16
[52] U.S. Cl. ................................................... 364/200
[58] Field of Search ... 364/200 MS File, 900 MS File; 340/147 LP

[56] References Cited

U.S. PATENT DOCUMENTS

| | | | |
|---|---|---|---|
| 2,969,522 | 1/1961 | Crosby, Jr. | 364/200 |
| 3,237,164 | 2/1966 | Evans | 364/200 |
| 3,470,542 | 9/1969 | Trantanella | 364/200 X |
| 3,740,722 | 6/1973 | Greenberg et al. | 364/200 |
| 3,755,789 | 8/1973 | Collins | 364/200 |
| 3,818,447 | 6/1974 | Craft | 340/147 LP |
| 3,866,181 | 2/1975 | Gayman et al. | 364/200 |
| 3,886,524 | 5/1975 | Appelt | 364/200 |
| 3,947,818 | 3/1976 | Kobayashi et al. | 340/147 LP |
| 3,978,451 | 8/1976 | Ito et al. | 340/147 LP |
| 3,993,981 | 11/1976 | Cassarino, Jr. et al. | 364/200 |
| 4,065,809 | 12/1977 | Matsumoto | 364/200 |
| 4,118,771 | 10/1978 | Pomella et al. | 364/200 X |
| 4,120,029 | 10/1978 | Steiner | 364/200 |
| 4,148,011 | 4/1979 | McLagan et al. | 340/147 LP |

Primary Examiner—Raulfe B. Zache
Attorney, Agent, or Firm—William T. McClain; William H. Magidson; Thomas R. Vigil

[57] ABSTRACT

The digital bus is an asynchronous, linear, open-ended digital bus which is coupled to two or more computer/controllers. The bus includes address control circuit lines comprising a bus busy line used by a controller to assert a bus busy signal thereon to gain control of the bus, and to determine if another computer/controller is using the bus, a receiver computer/controller request line used by a controller for requesting permission to send data to another controller, and a receiver computer/controller ready line used by a controller for indicating that that controller is ready to receive data. Data control circuit lines are also provided comprising a data ready line used by a controller for placing a ready-to-send-data signal thereon and a data accept line used by a controller for placing a ready-to-accept-data signal thereon. Also, address bus circuit lines are provided comprising five binary address lines used by a controller for placing an address thereon, which address can have up to five bits. The bus further includes sixteen data bus circuit lines coupled to the two or more controllers. Data to be transferred by a controller is placed on the data circuit lines. A voltage source is coupled to the digital bus lines for pulling up the voltage on all the digital bus lines to the voltage level of the voltage source to make certain that clear signals are provided on the bus and noise problems are avoided. The controllers use the digital bus to asynchronously transfer data and to resolve contention problems between different controllers when they try to gain control of the bus at the same time.

8 Claims, 4 Drawing Figures

DIGITAL BUS AND CONTROL CIRCUITRY FOR DATA ROUTING AND TRANSMISSION

BACKGROUND OF THE INVENTION

1. Field of the Invention

The field of the present invention is a digital bus for facilitating transfer of data between digital data collection devices. The field of the invention is also a multiple computer system and associated digital bus by which data can be rapidly transmitted between the various computers.

2. Description of the Prior Art

Heretofore, various systems have been proposed for facilitating the transmission of digital data from one digital device, such as a computer, in a group of such digital devices to any other device in the group. In computer terminology, this can be stated as a transmission of data from any node in a network to any other node. In such systems it is highly desirable to have rapid transfer of data between the various computers. Also it is desirable in such systems to have high reliability and low complexity of components (hardware) and low cost of components. In an attempt to meet this criteria, several systems have been proposed.

In one system including a plurality of, for example five, computers, direct connection is made between each pair of computers. High throughput of data between the computers is an advantage of this system since data can be transmitted between many pairs of computers simultaneously. Reliability is also high for this system since failure of a single computer does not affect the data path between the other computers. However, the hardware, circuitry, components and transfer lines, are clearly quite complex and costly.

Another system utilizes a central computer to which other computers are connected and through this central computer all data passes. The complexity of the hardware, circuitry and circuit components are at a low, acceptable level in this system. However, the throughput capacity for transfer of data is reduced since only one data transfer can take place at a time. More importantly, reliability is low since failure of the central computer is equivalent to failure of the entire multiple computer system.

In still another system, a circular arrangement of computers is established with line connections between adjacent computer devices in the circle. In this system, data received by one computer that is to be received by another computer in the circle is transferred from computer to computer until it reaches the receiving computer for which it was destined. The complexity of the circuitry and components thereof (hardware) is not too great and is at an acceptable level. However, failure of a single computer can result in total system failure. To avoid total system failure, elaborate schemes have been proposed for rerouting the data in an opposite direction if a computer is not operational. Again, however, failure of more than one computer will result in failure of the system. Also in the normal operation of this circular system an undesirable delay is introduced at each stop at a computer on the circular path during the transmission of data between non-adjacent computers.

As will be described in greater detail hereinafter, the digital bus of the present invention and a multiple computer system incorporating same avoid and/or minimize many of the shortcomings described above by providing a linear digital data bus. As will be explained in greater detail below, the complexity of the circuit components (hardware) is at an acceptable level since only one digital bus is required along with as many computer/interface/controller/coupling units or subsystems (hereinafter computer/controllers) as are required for the particular multiple computer system. Any computer/controller can be removed from the digital bus deliberately or through failure without affecting the other computer/controllers. Reliability of the system is therefore high. Also rapid transmission of data is achieved with the digital bus of the present invention. However, simultaneous transfer of data between more than two computers cannot be achieved with this system.

SUMMARY OF THE INVENTION

According to the invention there is provided an asynchronous, linear, open-ended digital bus for use with and adapted to be coupled to, two or more computer/controllers, said bus including address control circuit lines comprising a bus busy line used by a controller to assert a bus busy signal thereon to gain control of the bus and to determine if another computer/controller is using the bus, a receiver computer/controller request line used by a controller for requesting permission to send data to another controller, and a receiver computer/controller ready line used by a controller for indicating that the controller is ready to receive data, data control circuit lines comprising a data ready line used by a controller for placing a ready-to-send-data signal thereon and a data accept line used by a controller for placing a ready-to-accept-data signal thereon, address bus circuit lines comprising five binary address lines used by a controller for placing an address thereon, which address can have up to five bits, a plurality of data bus circuit lines coupled to the two or more controllers and adapted to receive data to be transferred thereon from a controller, and a voltage source coupled to the digital bus lines for pulling up the voltage on all the digital bus lines to the voltage level of the voltage source to make certain that clear signals are provided on the bus and noise problems are avoided.

Further according to the invention there is provided a multiple computer system including a plurality of computers, an equal number of controllers, each of which is coupled to one of the computers, and an asynchronous, linear, open-ended digital bus coupled to said plurality of controllers and including address control circuit lines comprising a bus busy line used by a controller to assert a bus busy signal thereon to gain control of the bus, and to determine if another controller is using the bus, a receiver computer/controller request line used by a controller for requesting permission to send data to another controller, and a receiver computer/controller ready line used by a controller for indicating that that controller is ready to receive data, data control circuit lines comprising a data ready line used by a controller for placing a ready-to-send-data signal thereon and a data accept line used by a controller for placing a ready-to-accept-data signal thereon, address bus circuit lines comprising five binary address lines used by a controller for placing an address thereon, which address can have up to five bits, a plurality of data bus circuit lines coupled to the two or more controllers, on which data bus circuit lines data to be transferred is placed, and a voltage source coupled to the digital bus lines for pulling up the voltage on all digital bus lines to the voltage level of the voltage source to make certain that clear signals are provided on the bus and noise problems are avoided, each of said controllers being a microprocessor for coupling a computer to the bus and such coupling being achieved by use of individual driver/receiver coupling means between each controller and the digital bus.

DESCRIPTION OF THE PREFERRED EMBODIMENT

Figure 1:
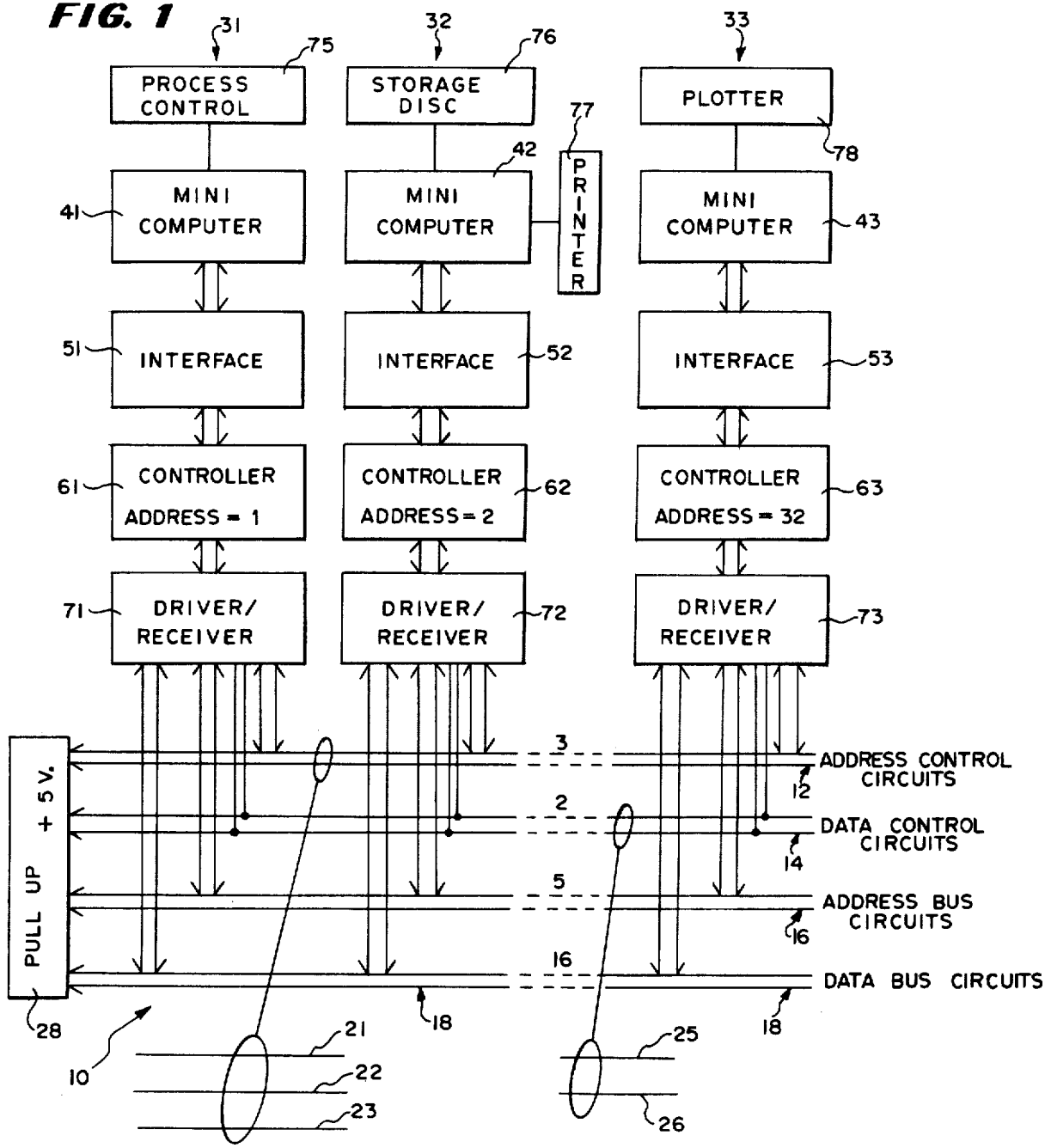
FIG. 1 is a block schematic diagram of a multiple computer system utilizing the digital bus of the present invention.

Referring now to the drawings in greater detail, there is illustrated in FIG. 1 the digital data bus (hereinafter digital bus) of the present invention which digital bus is generally identified by reference numeral 10. The digital bus 10 includes address control circuit lines 12, data control circuit lines 14, address bus circuits 16, and data bus circuits 18.

The address control circuit lines 12 include three address control lines 21,22, and 23. The line 21 is called a bus busy line 21. The line 22 is called a receiver computer/controller request line 22. And line 23 is called a receiver computer/controller ready line 23.

The data control circuit lines include a data accept line 25 and a data ready line 26.

The address bus circuit lines 16 include five binary address lines collectively identified by the reference numeral 16.

The data bus circuit lines include sixteen data lines collectively identified by the reference numeral 18.

All of the circuit lines 12, 14, 16 and 18 of the digital bus 10 are connected to a voltage source 28 for pulling up the voltage. In one realization of the digital bus 10 of the present invention a 5 volt pull-up source was utilized. Also, all the bus circuit elements are twisted pairs and the grounds of the digital bus are omitted from FIG. 1.

The digital bus 10 is a linear bus to which a plurality, i.e., thirty two, of computer/controller units or subsystems can be coupled for the routing and transmission of data between computers. Of course, it is to be understood that the number of address bus lines can be increased so that the digital bus 10 can accommodate more than thirty-two computer/controllers. Only three such computer/controller subsystems are shown in FIG. 1 and identified by reference numerals 31, 32 and 33. Each one of these systems includes a minicomputer 41, 42 or 43 which is coupled by an interface device 51, 52 or 53 to a microprocessor controller 61, 62 or 63 which in turn is coupled by driver/receiver coupling circuitry 71, 72 or 73 to the digital bus 10.

Also for the purpose of illustration the computer 41 is also connected to a process control/data collection apparatus 75. The computer 42 is connected to peripheral storage discs 76 and a printer 77. The computer 43 is connected to a plotter and/or cathode ray tube (CRT) 78.

In one realization of the multiple computer system illustrated in FIG. 1, the computers 41, 42 and 43 were MODCOMP$_{TM}$2 or 4 minicomputers manufactured by Modular Computer Systems, Inc. of Ft. Lauderdale, Fla. Each of the controllers 61–63 was realized by a microcomputer such as the PCS 180 Computer manufactured by Process Computer Systems, Inc. of Saline, Mich.

Figure 3:
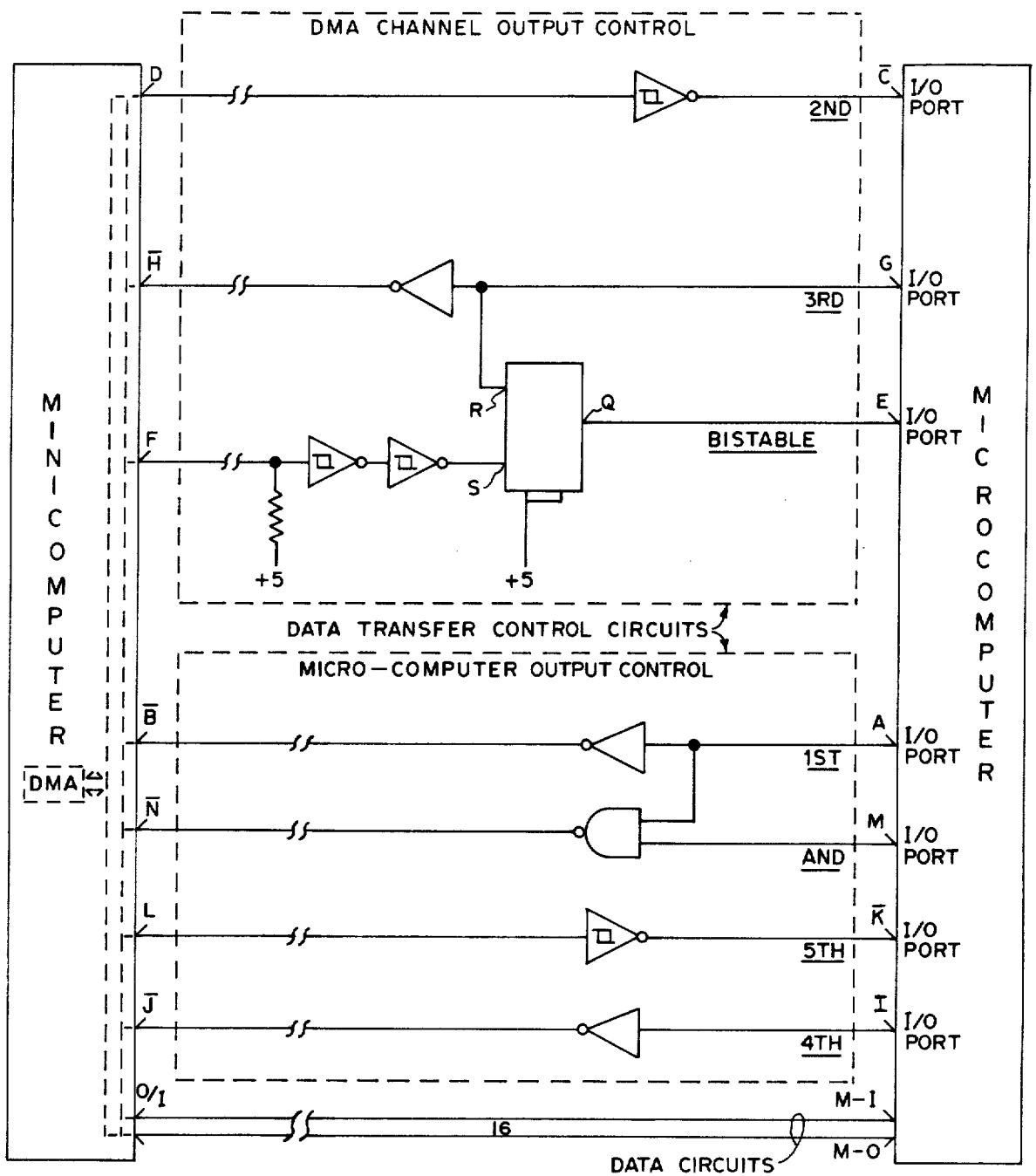
FIG. 3 is a block circuit diagram of an interface apparatus used to couple a computer of the system to a microcomputer forming a controller of the system.
Figure 4:
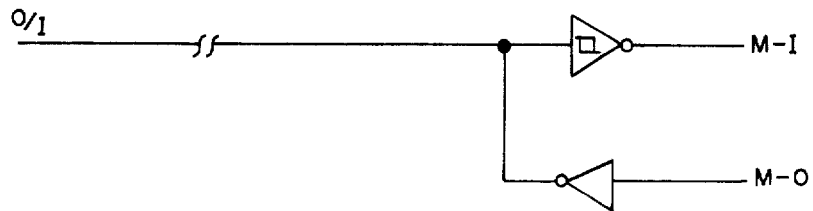
FIG. 4 is a schematic diagram of one of the data circuits utilized in the interface apparatus shown in FIG. 3.

Various interface devices can be utilized between the minicomputer 41, 42 or 43 and the microcomputer, i.e., microprocessor/controller 61, 62 or 63. For example, a so-called RS 232 asynchronous interface device which provides for serial transfer of data between the computers could be utilized. Such an interface device is described in a technical report dated August, 1969, issued by the Electronic Industries Association under the Ser. No. RS-232-C. Additionally, a parallel interface apparatus such as the so-called "INTEL$_{TM}$Multibus" could be utilized. Preferably, however, the interface device 51, 52 or 53 is a parallel data line interface device of the type disclosed in copending application Ser. No. 920,408, filed June 29, 1978 and entitled: INTERFACE APPARATUS FOR COUPLING A MINICOMPUTER TO A MICROCOMPUTER FOR THE TRANSFER OF DATA BETWEEN THEM AND METHOD FOR USING SAME, the disclosure of which is incorporated herein by reference. Briefly and with reference to FIGS. 3 and 4, such interface device includes sixteen bidirectional data circuits coupled between the direct memory access (DMA) controller of the minicomputer 41, 42 or 43 and the input/output (I/O) ports of the microprocessor controller 61, 62 or 63 for carrying data between them and seven data transfer control circuits coupled between the DMA controller and the I/O ports for controlling the transfer of data. The data transfer control circuits include three direct memory access channel output control circuits by which the DMA controller can obtain access to the interface device and four control circuits by which the microprocessor/controller can gain access to the interface device. The seven data transfer control circuits permit either computer: (a) to indicate by means of a control signal to the other that the one wants to transmit data, (b) to resolve contention between the computer and controller for access to the interface device, (c) to indicate to the one that the other is ready to receive data, (d) to effect transfer of data from the one to the other over the data circuits, (e) to indicate to the one that the other has received the data, (f) to repeat (c), (d) and (e) until all the data has been transferred, (g) to indicate to the other that all data has been transferred from the one and, (h) to remove the control signal from the data transfer control circuit to ready the same for receiving a control signal from either the computer or the controller.

The seven data transfer control circuits can be briefly described as follows:

(1) A first circuit means coupled between the computer and the controller for receiving a control signal from the controller which is readable by the computer.

(2) Second circuit means coupled between the computer and the controller for receiving a control signal from the computer which is readable by the controller, (3) Bistable circuit means coupled between the computer and the controller, the bistable circuit means including a bistable multivibrator which is preset to supply a signal to the controller that no data is ready to be transmitted and upon receiving a strobe signal from the computer then to provide a signal to the controller that data is ready to be transferred from the computer to the controller, (4) Third circuit means coupled between the computer and the controller and also to the bistable circuit means for carrying a reset signal to the bistable multivibrator and to indicate to the computer that the data has been received by the controller, (5) Fourth circuit means coupled between the computer and the controller for receiving a signal from the controller and transmitting same to the computer to indicate to the computer that the controller has data to send to the computer, (6) Fifth circuit means coupled between the computer and the controller for receiving a signal from the computer indicating that the computer is ready to receive data from the controller and for transferring the signal to the controller, and, (7) AND circuit means coupled between the computer and the controller and to the first circuit means and operable to receive the control signal at one input thereof from the first circuit means from the controller and to receive a strobe signal at another input thereof from the controller indicating that the controller is ready to transmit data and upon receiving both signal to send a signal to the computer that the data is ready to be transferred from the controller to the computer.

Further details of the construction and operation of such interface device 51, 52 or 53 can be obtained from the copending application referred to above.

Figure 2:
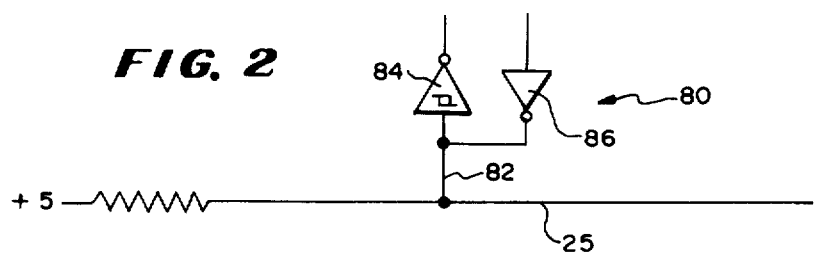
FIG. 2 is a schematic diagram of one of the driver/receiver circuits utilized in the driver/receiver coupling circuitry of the computer system.

Each driver/receiver coupling circuitry 71, 72 and 73 includes a plurality of driver/receiver circuits 80 as best shown in FIG. 2. Each driver/receiver circuit 80 is of the open collector type including a conductor 82 coupled to one of the digital bus lines such as for example the data accept line 25 and to the input of a Schmitt Trigger inverting buffer amplifier 84 having an output connected to one of the I/O ports of the microprocessor controller 61, 62 or 63. The driver/receiver circuit 80 also includes a buffer amplifier 86 having its output connected to the conductor 82 leading to the data bus line and its input connected to one of the I/O ports in the microprocessor controller.

Each of the controllers, e.g., controllers 61, 62 and 63 has an address and in the illustrated embodiment controller 61 has the address 1, controller 62 has the address 2 and controller 63 has the address 32.

In the operation of the multiple computer system shown in FIG. 1 utilizing the digital bus 10, the occasion will arise when one computer such as the computer 41 will wish to obtain a print of the data being obtained by computer 41 from process control/data collection apparatus 75 (which can be a gas chromatography data collection device) and since computer 41 does not have a printer attached thereto, computer 41 will want to transmit data to the computer 42 connected to printer 77 to effect printing of the data. It may also want to store this data on the peripheral storage disc 76 connected to the computer 42.

On the other hand the computer 41 may wish to compare previously collected data which has been stored on the peripheral storage disc 76 with data it is collecting from the apparatus 75. In this event, it will transmit data to the computer 42 to tell it to send data to the computer 41.

Whatever the particular data message being transferred from one computer to another computer, the protocol is the same, and this protocol is burned into each of the controllers 61, 62 or 63. All that the computer 41, 42 or 43 has to do is tell its associated controller 61, 62 or 63 that it wants to transmit data and which computer/controller is to receive the data. Then, transfer of data between the computer and the controller is effected by the interface device and the controller then utilizes the digital bus to make contact with, and to transfer data to, the receiving computer/controller subsystem. In this respect, it makes contact with the receiving controller.

The protocol for sending data from one computer to another computer by means of the sending controller and receiving controller will now be described below.

First of all, the sending computer tells the associated controller that it has data to transfer. The transfer of data to the controller is accomplished with the interface device. Then the controller must gain control of the digital bus before it can transmit the data to a receiving controller. This is achieved by first examining the bus busy line 21 to see if the logic signal thereon is true. If the logic signal thereon is true no further action is taken since this means that the digital bus 10 is being used by other computer/controllers. Accordingly, no further action is taken until the logic state on the busy line 21 goes false. When the busy line logic state is false, the sending controller outputs its own binary address to the address bus circuits (lines) 16 and asserts or supplies a logic signal to the busy line 21 to indicate that the digital bus 10 is busy. Immediately thereafter the sending controller makes a comparison of its address with the address on the address lines 16. If the two addresses do not compare the sending controller removes its address from the address lines 16 and removes the logic signal from the busy line 21 since another controller has made a simultaneous attempt to gain control of the bus. After a predetermined time delay, another attempt is made by the sending controller to obtain control of the digital bus 10. Again, if, after following the procedure described above the addresses do compare, control is acquired of the digital bus 10 and the protocol for the transmission of data can now proceed.

It is to be understood that there will be a different timing cycle for attempting to gain control for each controller so that "hunting", i.e., the stopping and then the attempting at the same time to gain control by two controllers is prevented. However, with the different controllers having a different binary address, the contention problem between two controllers is first resolved by the address that would appear if several controllers were trying to gain access to the bus at the same time. For example, with the first controller having a binary address number 01, the second controller having a binary address 10, and the third controller having the binary address 11, it will be apparent that whenever the third controller supplies its address 11 on two of the address lines and either the first or second controller supplies its address 01 or 10 on the same two address lines, the third controller will always read back its address of 11 and will proceed to take control of the digital bus 10 and carry on with the protocol for transmitting data. Thus the third controller would have a predetermined time delay of zero whereas the first and second controllers would have different predetermined time delays. Accordingly, depending upon the number of computer/controller subsystems coupled to the digital bus 10, some of the contention problems will be resolved by the binary address of a particular controller and contention problems with other controllers will be determined by the different predetermined time delays included in the computer program software logic (protocol) burned into the various controllers.

Once control is gained of the digital bus 10, the correct receiving controller must now be informed that data is about to be sent to it. This is accomplished by the sending controller supplying the address of the receiver controller to the address bus circuits (lines) 16. At the same time, the message word count of the data message to be transferred is output to the data bus circuits (lines) 18 and a logic signal is set on the receiver computer/controller request line 22. Then the receiver computer/controller ready line 23 is polled or examined for a true condition which is set by the receiving controller if and when it is ready to receive data. If the receiving controller does not supply a true signal on the receiver computer/controller ready line 23 within a specified short time period, the receiving controller is assumed to be nonoperational and all signals put on the digital bus 10 by the sending controller are cleared.

On the other hand, if the signal on the receiver computer/controller ready line 23 goes true within the short time period, the sending controller removes the signals it had supplied to the receiver computer/controller request line 22 and on the address bus circuits (lines) 16 so that transmission of data can now proceed.

A data word is then output from the sending controller to the data bus circuits 18, i.e., the data lines, and the logic sense or state of the data ready line 26 is switched. Receipt of data by the receiving controller is then acknowledged by the receiving controller causing a change in the logic state of the data accept line 25 and this process is repeated until all data has been transferred. The entire digital bus 10 is then cleared by the sending controller which then returns to an idle state and the data transmission is completed.

Each data output operation is timed so that failure of the receiving controller to accept the data is detected. In this respect if a transition in the logic state on the data accept line 25 does not occur within the specified short peroid of time, the receiving controller is assumed to have failed, the data transfer procedure is terminated, and the entire digital bus is cleared of signals by the sending controller.

The protocol burned into a controller for receiving data is now described below:

It will be understood that each controller is normally in an idle state monitoring the logic state on the receiver computer/controller request line 22. Whenever a true logic signal is detected on the receiver computer/controller request line 22, the potential receiving controller examines the address bus circuits (lines) 16 to see what address is on the address lines 16. When a receiving controller's address does not match the contents of the address lines the potential receiving controller returns to an idle state. However, if the addresses do match, the receiving controller proceeds to save the transfer word count that is present on the data lines 18. The receiving controller then asserts a logic signal on the busy line 21 to indicate that the digital bus 10 is busy and then changes the logic state on the receiver computer/controller ready line 23 to inform the sending controller that the selected receiving controller has responded.

The receiving controller then monitors the transition in logic states on the data ready line 26 and each time a transition in logic state on the data ready line 26 occurs, the contents of the data lines 18 is inputted into the receiving controller. After a data word has been read into the receiving controller, the receiving controller changes the logic state on the data accept line 25 and this transition tells the sending controller that it should transmit another data word. This procedure continues until the transfer count is decremented to zero by the receiving controller. At this point, the receiving controller removes and clears the logic signals it had previously imposed on the busy line 21, the data accept line 25 and the receiver computer/controller ready line 23 and the receiving controller returns to its idle state.

Each input operation is timed by the receiving controller so that failure of the sending controller can be detected. In this respect if a transition in the logic state on the data ready line 26 does not occur within a predetermined short time period the sending computer is assumed to have failed and the logic states on the busy line 22, the data accept line 25 and the receiver computer/controller ready line 23 are cleared to reset the digital bus 10 for use by another computer/controller.

As described above the computer/controllers coupled to the digital bus 10 form a powerful and flexible intercomputer or multiple computer communication system in a distributed processing, or network, environment. Also it will be apparent from the foregoing description that the digital bus 10 and the multiple computer system utilizing same of the present invention have many advantages, some of which have been described above and other of which are inherent in the present invention. It this respect the digital bus and multiple computer system have the advantages of reliability, speed and hardware simplicity over many of the currently available data transfer and routing systems. Moreover, since each of the microprocessor controllers can perform message formatting and communication overhead functions, it is relatively easy to interface computers of different makes. In this respect, although one type of minicomputer has been described above, it is to be understood that other types of minicomputers can be interfaced to the microprocessor controllers and coupled to the digital bus 10. Also the protocol needed by the computer to utilize the controllers and the digital bus is relatively simple. Such software, i.e., computer program/protocol, can be easily developed for various computers. The multiple computer system or network incorporating the digital bus 10 then can be used as an alternative to the computer dependent systems for collecting and transmitting data which are presently available from computer manufacturers.

A multiple computer system using the digital bus 10 also has the advantage that one minicomputer has access to the programs in other minicomputers and to the peripheral equipment attached to other minicomputers. Accordingly, a minicomputer of the multiple computer system has the capability of a much larger computer, that is to say, it has the capability of the total computer system and such a multiple computer system is very useul in a gas chromatography data collection system and can be utilized as part of a large scale laboratory or in the field data acquisition system.

Moreover, it will be apparent from the foregoing description that the digital bus 10 and the multiple computer system incorporating same of the present invention can be modified without departing from the teachings of the present invention. Accordingly, the scope of the present invention is only to be limited as necessitated by the accompanying claims.

We claim:

1. An asynchronous, linear, open ended digital bus for use with and adapted to be coupled to, two or more computer/controllers, said bus including address control circuit lines comprising a bus busy line used by a controller to assert a bus busy signal thereon to gain control of the bus and to determine if another computer/controller is using the bus, a receiver computer/-controller request line used by a controller for requesting permission to send data to another controller, and a receiver computer/controller ready line used by a controller for indicating that the controller is ready to receive data, data control circuit lines comprising a data ready line used by a controller for placing a ready-to-send-data signal thereon and a data accept line used by a controller for placing a ready-to-accept-data signal thereon, address bus circuit lines comprising five binary address lines used by a controller for placing an address thereon, which address can have up to five bits, a plurality of data bus circuit lines coupled to the two or more controllers and adapted to receive data to be transferred thereon from a controller, and a voltage source coupled to the digital bus lines for pulling up the voltage on all the digital bus lines to the voltage level of the voltage source to make certain that clear signals are provided on the bus and noise problems are avoided.

2. The digital bus according to claim 1 wherein said plurality of data bus circuit lines include sixteen data lines.

3. A multiple computer system including a plurality of computers, an equal number of controllers and interface devices, each controller being coupled through one interface device to one of the computers, and an asynchronous, linear, open-ended digital bus coupled to said plurality of controllers and including address control circuit lines comprising a bus busy line used by a controller to assert a bus busy signal thereon to gain control of the bus, and to determine if another controller is using the bus, a receiver computer/controller request line used by a controller for requesting permission to send data to another controller, and a receiver computer/controller ready line used by a controller for indicating that that controller is ready to receive data, data control circuit lines comprising a data ready line used by a controller for placing a ready-to-send-data signal thereon and a data accept line used by a controller for placing a ready-to-accept-data signal thereon, address bus circuit lines comprising five binary address lines used by a controller for placing an address thereon, which address can have up to five bits, a plurality of data bus circuit lines coupled to the two or more controllers, on which data bus circuit lines data to be transferred is placed, and a voltage source coupled to the digital bus lines for pulling up the voltage on all digital bus lines to the voltage level of the voltage source to make certain that clear signals are provided on the bus and noise problems are avoided, each of said controllers being a microprocessor for coupling a computer to the bus and such coupling being achieved by use of individual driver/receiver coupling means between each controller and the digital bus.

4. The system according to claim 3 wherein each said interface device is an asynchronous interface device for effecting the serial transmission of data between each said computer and each said controller.

5. The system according to claim 3 wherein each said interface device is a parallel data line interface device.

6. The system according to claim 5 wherein each said interface device is operable to transfer data at a speed of up to at least 1.6 megabits per second between a minicomputer (computer) and a microcomputer (controller), and wherein said device comprises a plurality of bidirectional data circuits parallel coupled between the computers for carrying data between the computers when either computer wants to send data to the other, and data transfer control circuit means coupled between the computers for permitting either computer, when it wants to send data, to:

(a) indicate by means of a control signal to the receiving computer that the sending computer wants to transmit data over the data circuits, (b) resolve contention between the computers for access to the interface apparatus, (c) enable the receiving computer to indicate to the sending computer that the receiving computer is ready to receive data over the data circuits, (d) effect transfer of data from the sending computer to the receiving computer over the data circuits, and (e) enable the receiving computer to indicate to the sending computer that the receiving computer has received the data, said data transfer control means including:

(A) a first circuit means coupled between the computers for receiving a first control signal from the microcomputer indicating that it wants to send data, which first control signal, as transmitted by said first circuit means, is readable by the minicomputer, (B) second circuit means coupled between the computers for receiving a second control signal from the minicomputer indicating that it wants to send data, which second control signal, as transmitted by said second circuit means, is readable by the microcomputer, (C) bistable circuit means coupled between the computers, said bistable circuit means including a bistable multivibrator which has a set input and which is preset to supply a "no" signal to the microcomputer indicating that no data is ready to be transmitted and, upon receiving a strobe signal from the minicomputer after the minicomputer has sensed that a first control signal is not present on said first circuit means and has then asserted a second control signal on said second circuit means and has presented data to said data circuits, then to provide a "yes" signal to the microcomputer indicating that data is ready to be transferred from the minicomputer to the microcomputer over said data circuits so that when the microcomputer reads the "yes" signal it can then input the data on said data circuits, (D) third circuit means coupled between the computers and to said bistable circuit means for carrying a reset signal from the microcomputer, indicating that it has input the data, to a reset input of said bistable multivibrator to reset same and to indicate to the minicomputer that the data has been received and input by the microcomputer, (E) fourth circuit means coupled between the computers for receiving a signal from the microcomputer and transmitting same to the minicomputer to indicate to the minicomputer that the microcomputer has data to send to the minicomputer, (F) fifth circuit means coupled between the computers for receiving a signal from the minicomputer indicating that the minicomputer is ready to receive data from the microcomputer and for transferring the signal to the microcomputer, and (G) AND circuit means coupled between the computers and to said first circuit means and operable to receive the first control signal from the microcomputer at one input thereof which is coupled to said first circuit means and to receive a strobe signal at another input thereof from the microcomputer indicating that the microcomputer is ready to transmit data and upon receiving both signals to send a signal to the minicomputer that the data is ready to be transferred from the microcomputer to the minicomputer over the data circuits.

7. The system according to claim 3 wherein said data bus circuit lines include sixteen data lines.

8. The system according to claim 3 wherein said driver/receiver coupling means includes a plurality of driver/receiver circuits, each driver/receiver circuit being of the open collector type including a conductor connected to the associated digital bus line and to the input of an inverting buffer amplifier having its output coupled to said controller and to the output of an inverting amplifier having its input coupled to said controller.

* * * * *